(12) United States Patent
Arai (10) Patent No.: US 7,182,897 B2
(45) Date of Patent: Feb. 27, 2007

(54) METHOD OF STORING MATERIAL INTO WHICH GAS SATURATES

(75) Inventor: Takashi Arai, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 593 days.

(21) Appl. No.: 10/634,860

(22) Filed: Aug. 6, 2003

(65) Prior Publication Data

US 2004/0070098 A1 Apr. 15, 2004

(30) Foreign Application Priority Data

Aug. 7, 2002 (JP) .............................. 2002-230323

(51) Int. Cl.
*B29C 44/34* (2006.01)
(52) U.S. Cl. ........................... 264/51; 264/232; 521/50
(58) Field of Classification Search ................ 264/50, 264/51, 85, 232; 521/50
See application file for complete search history.

(56) References Cited

U.S. PATENT DOCUMENTS

| | | | |
|---|---|---|---|
| 3,268,639 A | 8/1966 | Taft et al. ..................... 264/78 |
| 3,384,691 A | 5/1968 | Weissman et al. ............. 264/47 |
| 4,399,087 A * | 8/1983 | Akiyama et al. ............. 264/53 |
| 4,443,393 A * | 4/1984 | Akiyama et al. ............. 264/53 |
| 4,473,665 A | 9/1984 | Martini-Vvedensky et al. ............................ 521/79 |
| 5,158,986 A | 10/1992 | Cha et al. ...................... 521/82 |
| 5,160,674 A | 11/1992 | Colton et al. .................. 264/50 |
| 5,334,356 A | 8/1994 | Baldwin et al. ............. 422/133 |
| 5,571,848 A | 11/1996 | Mortensen et al. ........... 521/61 |
| 5,763,498 A * | 6/1998 | Knaus .......................... 521/60 |
| 5,866,053 A | 2/1999 | Park et al. .................... 264/50 |
| 5,997,781 A * | 12/1999 | Nishikawa et al. ........ 264/45.1 |
| 2002/0014709 A1* | 2/2002 | Arai ........................... 264/40.6 |

FOREIGN PATENT DOCUMENTS

| | | |
|---|---|---|
| EP | 0 610 953 A1 | 8/1994 |
| EP | 1 186 392 A1 | 3/2002 |
| JP | 60-166412 | 8/1985 |
| JP | 8-85128 | 4/1996 |
| JP | 8-85129 | 4/1996 |
| JP | 10-36547 | 2/1998 |
| JP | 10-279725 | 10/1998 |
| JP | 11-293022 | 10/1999 |
| JP | 2000-327826 | 11/2000 |
| JP | 2003-73496 | 3/2003 |

* cited by examiner

*Primary Examiner*—Frank M. Lawrence
(74) *Attorney, Agent, or Firm*—Fitzpatrick, Cella, Harper & Scinto (57) ABSTRACT

A method of storing a material into which a gas saturates, before the material is foamed in a metal mold. The material into which a gas saturates is stored at a predetermined ambient pressure and predetermined ambient temperature to maintain a gas saturated state, thereby preventing escape of the gas from the material into which the gas saturates.

5 Claims, 8 Drawing Sheets

| | HIPS (A) | HIPS (B) | HIPS (A) | HIPS (A) | HIPS (C) | HIPS (A) | HIPS (A) |
|---|---|---|---|---|---|---|---|
| FOAMING AGENT | $CO_2$ | $CO_2$ | $CO_2$ | $CO_2$ | $CO_2$ | $CO_2$ | $CO_2$ |
| SATURATION PRESSURE Mpa | 6 | 6 | 8 | 8 | 8 | 8 | 9 |
| SATURATION TEMPERATURE °C | 50 | 50 | 20 | 50 | 50 | 50 | 40 |
| SATURATION TIME h | 1 | 1 | 1 | 1 | 1 | 2 | 1 |
| STORAGE PRESSURE Mpa | 1 | 1 | 1.2 | 1.6 | 1.6 | 2 | 2.5 |
| STORAGE TEMPERATURE °C | 10 | 10 | −3 | 5 | 5 | 7 | 4 |
| STORAGE TIME h | 0.5 | 1 | 1 | 1 | 2 | 1 | 1 |
| WEIGHT CHANGE % | <1% | <1% | <1% | <1% | <1% | <1% | <1% |

FIG. 8

| | HIPS (A) | HIPS (A) | PC/ABS | PPE | PPE+GF | PPE+PS | PC |
|---|---|---|---|---|---|---|---|
| FOAMING AGENT | $CO_2$ | $N_2$ | $CO_2$ | $CO_2$ | $CO_2$ | $CO_2$ | $N_2$ |
| PERMEATION PRESSURE Mpa | 8 | 8 | 8 | 8 | 8 | 8 | 9 |
| PERMEATION TEMPERATURE °C | 50 | 50 | 50 | 50 | 50 | 50 | 50 |
| PERMEATION TIME h | 1 | 1 | 1 | 1 | 1 | 1 | 1 |
| STORAGE PRESSURE Mpa | 1.5 | 2.4 | 1.2 | 1.8 | 2 | 1.8 | 2 |
| STORAGE TEMPERATURE °C | 5 | 3 | -3 | 7 | 15 | 3 | 10 |
| STORAGE TIME h | 1 | 1 | 1 | 1 | 2 | 1 | 1 |
| WEIGHT CHANGE % | <1% | <1% | <1% | <1% | <1% | <1% | <1% |

METHOD OF STORING MATERIAL INTO WHICH GAS SATURATES

FIELD OF THE INVENTION

The present invention relates to a technique which performs injection foaming or extrusion foaming by allowing a foaming agent such as an inert gas to saturate into a polymer and a rubber material, thereby obtaining a foamed product having a foamed interior.

BACKGROUND OF THE INVENTION

Foam forming has a long history. For example, techniques of obtaining resin foamed products by injection foaming are disclosed in U.S. Pat. Nos. 3,268,639 and 3,384,691. In recent years, methods of foam forming using chemical foaming agents or physical foaming agents are described in synthetic resin foaming textbooks.

Recently, a method and an apparatus for forming a very small foam called a microcell was described by the Massachusetts Institute of Technology, U.S.A., in U.S. Pat. Nos. 4,473,665, 5,158,986, 5,160,674, 5,334,356, 5,571,848, and 5,866,053. In the method and apparatus proposed by the Massachusetts Institute of Technology, U.S.A., a supercritical inert gas is blown into a portion where a resin is melted in a plasticator of an injection foaming machine, and the well-melted resin and the gas are mixed by a static mixer. It was reported that when the pressure and temperature were controlled, a large number of cells of 25 μm or less were evenly dispersed in the formed foamed product, and the foamed product had almost no strength deterioration since the cell size was small. The above references also describe a method by which a resin material is placed in a pressure vessel, a supercritical inert gas is allowed to saturate into the resin material, and the resin is foamed by abruptly reducing the pressure at a temperature near the melting temperature of the resin, and a method by which the resin is foamed by abruptly raising the temperature after the temperature and pressure are once lowered.

Japanese Patent Laid-Open Nos. 8-85128 and 8-85129 describe methods by which a pressure-resistant chamber is attached to a hopper of an injection foaming machine, and a gas is allowed to saturate into a molten resin or resin pellets at a high pressure, thereby foaming the resin.

That is, the conventional foam forming is roughly classified as chemical foaming and physical foaming. The chemical foaming includes a master batch method in which a foaming agent which causes a chemical reaction by heat and a resin material are mixed in the form of pellets, and a method in which the foaming agent is kneaded in a resin material. The physical foaming includes a method in which an inert gas is allowed to directly saturate into a molten resin from a plasticator of an injection foaming machine or extruder, and a batch method in which an inert gas is allowed to saturate into a previously foamed and shaped resin product at a high temperature and high pressure, and the resultant material is foamed in a pressure vessel by abruptly changing the temperature or pressure.

In the conventional chemical foaming, the master batch method by which a heat decomposable foaming material and a resin material are mixed immediately before foaming is often used. Unfortunately, this method has many problems such as harmfulness, mold corrosion, the worsening of the foaming environment, and the difficultly of handling. In contrast, the physical foaming is harmless and causes no mold corrosion, and nitrogen and carbon dioxide exist in natural air. Therefore, the physical foaming is regarded as superior to the chemical foaming. However, in the method of allowing an inert gas to saturate directly into a molten resin, the gas is directly blown into the molten resin material, so a portion of the molten resin in contact with the gas is rapidly cooled when the gas is blown. If the gas is continuously blown, a large portion of the molten resin is cooled. Consequently, the viscosity rises, and it takes a long time to restore the resin temperature and viscosity suited to foaming.

Also, when a gas is heated to a temperature close to the melting temperature of a resin in advance, the volume of the gas increases with the temperature rise. Therefore, if the gas is directly blown into the molten resin, the foaming magnification after the resin is charged into a foam significantly decreases because the internal pressure of the resin is low.

Furthermore, to compensate for this drawback, it is possible to raise the pressure together with the gas temperature, and blow the gas into the molten resin while the gas concentration is maintained. In this method, however, the gas pressure is very high, and the gas flows into the molten resin at the moment when the gas is blown into it. This makes it difficult to control the gas blowing amount, and increases variations in the amount of the gas, which saturates into the resin. Also, since the gas is abruptly blown into the molten resin, the molten resin forms two separated layers of the gas and resin near the blowing port. Therefore, to evenly disperse the gas in the resin, it is necessary to mechanically repeat the kneading by using a static mixer or the like, and encourage dissolution of the gas into the resin by raising the pressure of the resin-gas mixture itself. This complicates the apparatus, and variations in gas saturation amount in the material vary the dimensional accuracy of the foamed product and deteriorate the product quality. In addition, the long cycle reduces the productivity.

The batch method using an inert gas eliminates both the drawbacks of the chemical foaming and the drawbacks of the physical foaming by which a gas is directly blown into a molten resin. However, since this batch method is an intermittent production method using batch processing, the productivity is significantly reduced.

A method such as the one described in Japanese Patent Laid-Open No. 8-85128, in which a gas is allowed to saturate into a resin material by the batch method and then the material is continuously foamed by an injection foaming machine, compensates for the above-mentioned drawbacks. However, the amount of the gas which saturates into a solid resin material, such as pellets, changes in accordance with the gas pressure, temperature, and time. Accordingly, if the foaming cycle or gas saturation time changes even slightly, the amount of the gas which saturates into a resin material changes. Since this changes the foamed state of the foamed product, the accuracy also changes.

SUMMARY OF THE INVENTION

The present invention, therefore, has been made in consideration of the above situation, and an object thereof to obtain a high-accuracy foamed product with high productivity.

To solve the above problems and achieve the object, according to a first aspect of the present invention, there is provided a method of storing a material into which a gas saturates, before the material is foamed in a metal mold, while maintaining a gas saturated state, wherein the material into which the gas saturates is stored at a predetermined ambient pressure and predetermined ambient temperature, thereby preventing escape of the gas from the material into which the gas saturates.

According to a second aspect of the present invention, there is provided a method of storing a material into which a gas saturates, wherein a gas is allowed to saturate into a resin material at a saturation pressure P (MPa) of 4 (MPa) or more and a temperature T (° C.), and, letting m ($-0.05<m<0.2$) be a coefficient determined by a material type and a gas saturation time. The material is stored in an ambient defined by a pressure p (MPa) represented by $p=P(0.02P+m)$ and a temperature t represented by $0.1875T-10<t<0.5T-1-0$, where $20°$ C.$\leq T \leq 60°$ C., and represented by $0.1875T-10<t \leq 20°$ C., where $T>60°$ C.

According to a third aspect of the present invention, there is provided a method of storing a material into which a gas saturates, wherein 0.1 to 1.5 wt % of supercritical carbon dioxide is allowed to saturate into a pelletized solid resin material, and the solid resin material is stored at a temperature lower than a gas temperature when the carbon dioxide saturates, and at a high gas density.

According to a fourth aspect of the present invention, there is provided a method of storing a material into which a gas saturates, wherein 0.1 to 1.5 wt % of supercritical carbon dioxide at a gas density of 0.08 to 0.2 g/cm$^3$ is allowed to saturate into a pelletized solid resin material, and the solid resin material is stored at a gas density of 0.7 to 1.0 g/cm$^3$.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
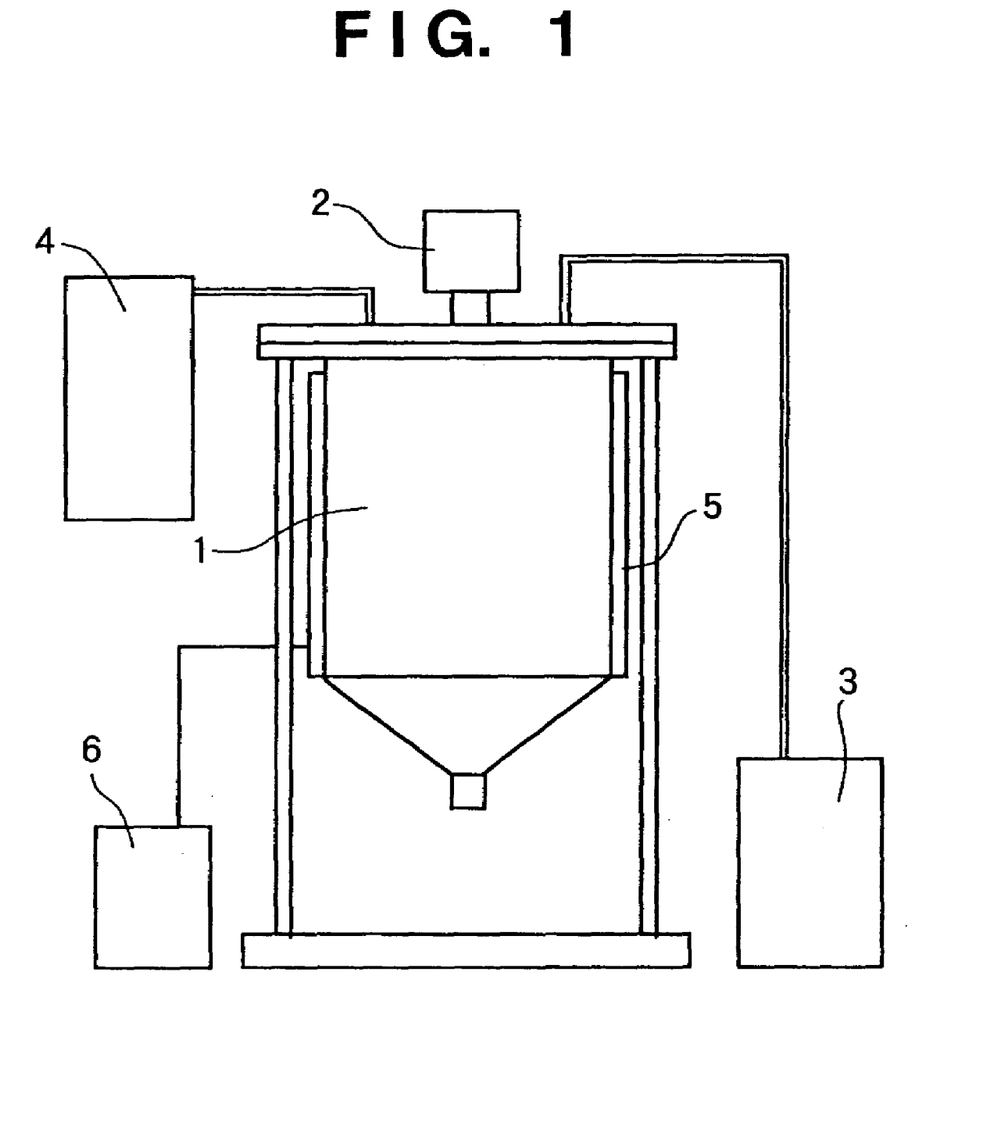
FIG. 1 is a view showing an apparatus of an embodiment of the present invention.

FIG. 1 is a view showing an apparatus of an embodiment of the present invention.

In FIG. 1, reference numeral 1 denotes a vessel; 2, an agitator; 3, a high pressure gas generator; 4, a cooling medium controller; 5, a heater; and 6, a heater controller.

Figure 2:
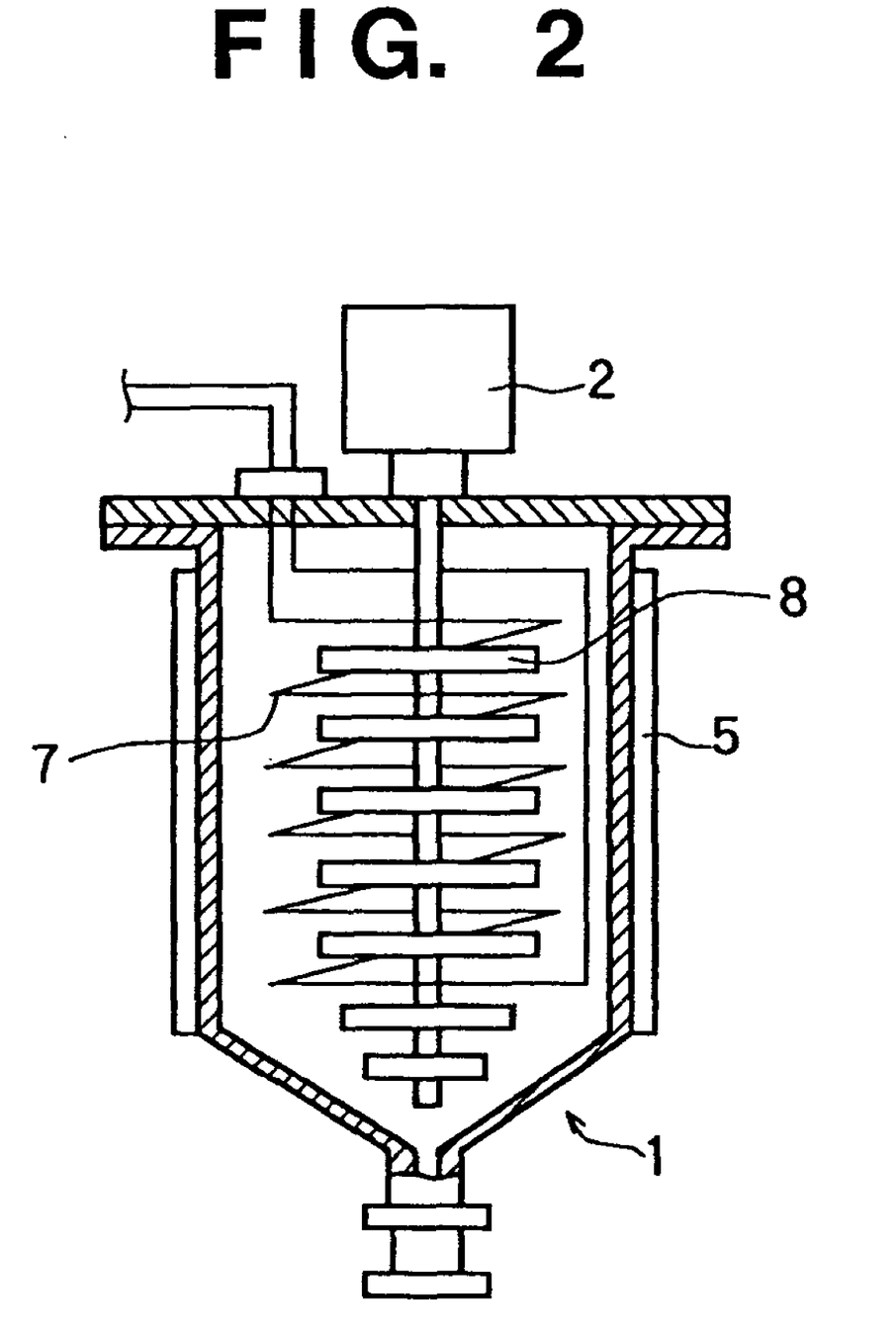
FIG. 2 is a view showing the internal structure of a vessel 1 shown in FIG. 1.

FIG. 2 is a view showing the internal structure of the vessel 1 shown in FIG. 1.

In FIG. 2, reference numeral 7 denotes a pipe in which a cooling medium circulates; and 8, agitating blades. In the vessel 1, a solid material into which an inert gas as a foaming agent saturates is agitated by the agitating blades 8 connected to the agitator 2, and cooled by the cooling medium which is controlled at a predetermined temperature by the cooling medium controller 4 and circulates in the pipe 7. Also, an inert gas pressurized to a predetermined pressure by the high pressure gas generator 3 is filled into the vessel 1. The heater 5 is installed outside the vessel 1, and the heater controller 6 controls the temperature of the vessel 1.

Figure 7:
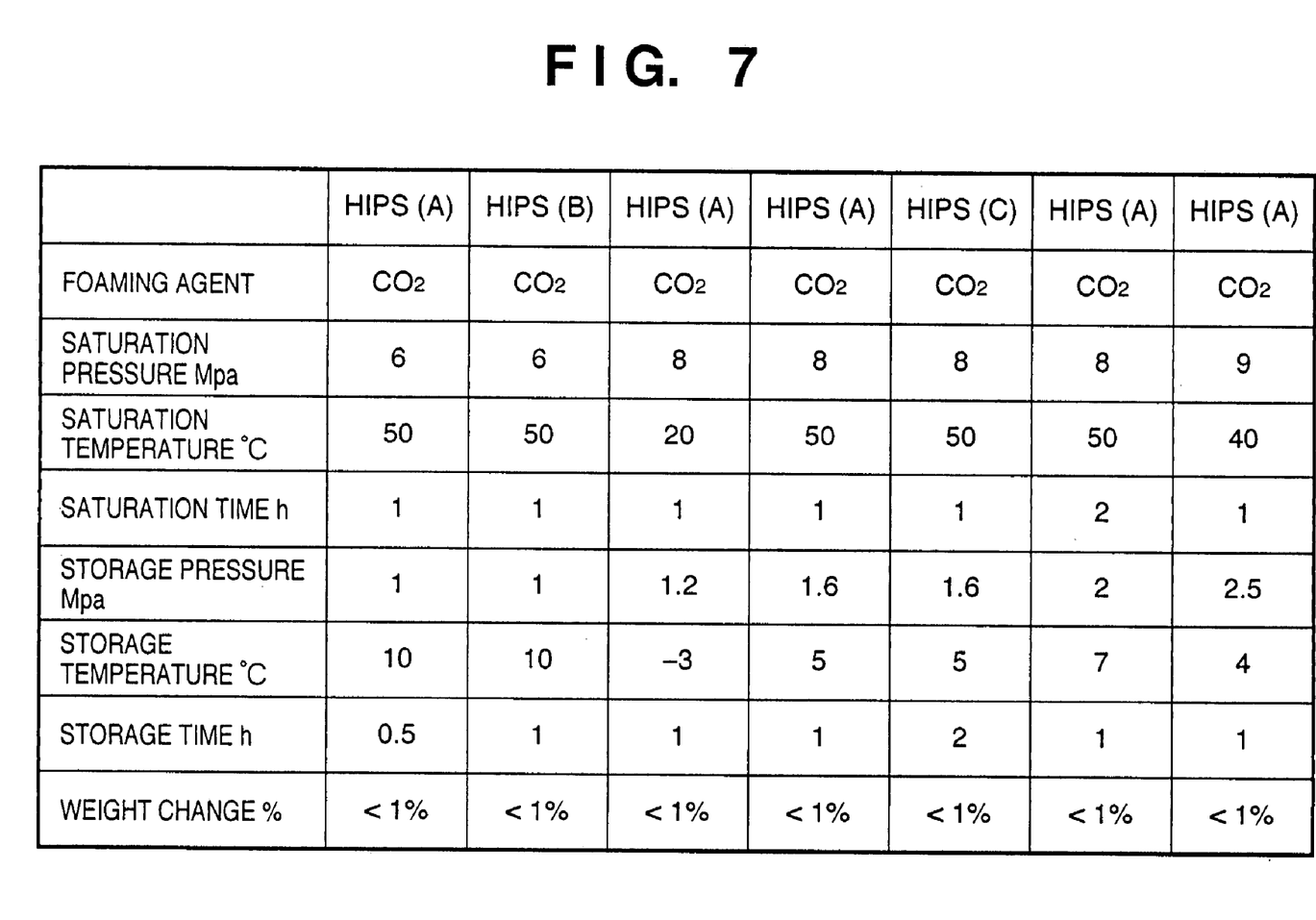
FIG. 7 is a view showing the first example of the embodiment.

FIG. 7 is a view showing the first example according to the embodiment.

The first example will be explained below with reference to FIG. 7.

As resin materials, three types (A, B, and C) of high-impact polystyrene (HIPS) were used. Carbon dioxide was used as an inert gas as a foaming agent. FIG. 7 shows the saturation pressure, saturation temperature, and saturation time by which the carbon dioxide was allowed to saturate into the resin material, and also shows the storage pressure and storage temperature of this example.

The storage time in FIG. 7 means the time elapsed since the pressure and time were controlled to the storage pressure and storage time of this example after gas saturation. The weight change is a change ratio calculated by comparing the weight when five minutes elapsed in atmosphere after gas saturation was complete with the weight measured in atmosphere after the material was stored at the storage pressure and storage temperature of this example, i.e., after the storage time elapsed.

The storage time and weight change in FIG. 7 indicate that a change in the amount of the gas which saturated into the resin material was 1% or less even after the storage time elapsed, i.e., there was almost no change in gas amount.

That is, when a resin material into which a gas saturates is stored under the storage conditions of this example, escape of the gas from the resin material can be decreased to a very small amount.

Practical storage conditions are as follows. A gas is allowed to saturate into a resin material at a saturation pressure P (MPa) of 4 (MPa) or more and a temperature T (° C.). After that, letting m ($-0.05<m<0.2$) be a coefficient determined by the material type and the gas saturation time, the resin material is stored in an ambient defined by a pressure p (MPa) represented by $p=P(0.02P+m)$ and a temperature t represented by $0.1875T-10 <t <0.5T-10$ where $20°$ C.$\leq T \leq 60°$ C.

and represented by $0.1875T-10<t \leq 20°$ C.

where $T>60°$ C.

Also, the gas saturation amount after storage is 0.1 to 0.4 wt %.

More specifically, 0.1 to 1.5 wt % of supercritical carbon dioxide are allowed to saturate into a pelletized solid resin material, and the solid resin material is stored at a temperature lower than the gas temperature when the carbon dioxide saturates and at a high gas density.

Alternatively, 0.1 to 1.5 wt % of supercritical carbon dioxide at a gas density of 0.08 to 0.2 g/cm³ is allowed to saturate into a pelletized solid resin material, and the solid resin material is stored at a gas density of 0.7 to 1.0 g/cm³.

Figure 5:
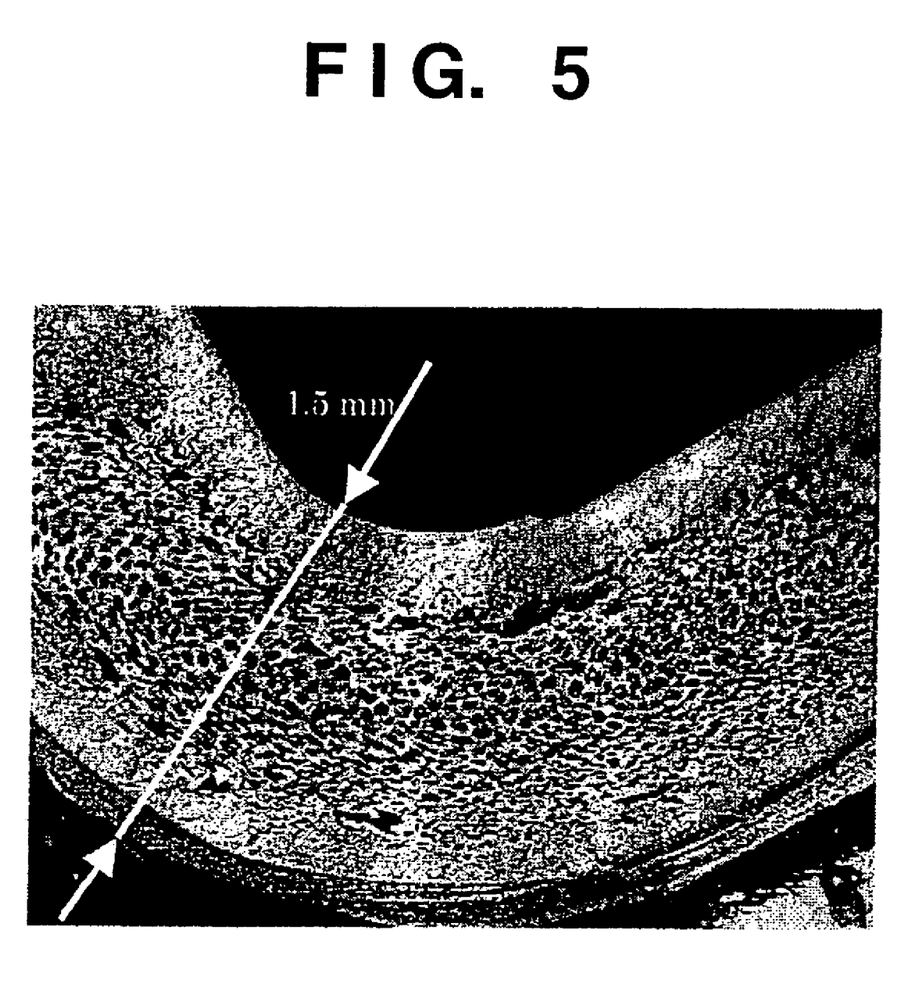
FIG. 5 is a view showing the foamed state of the section of a foamed product obtained by injection foaming after being stored for 1 hr by a storage method of this embodiment.

FIG. 5 shows the foamed state of the section of a foamed product obtained by injection foaming after being stored for 1 hr by the control method of this example.

Figure 6:
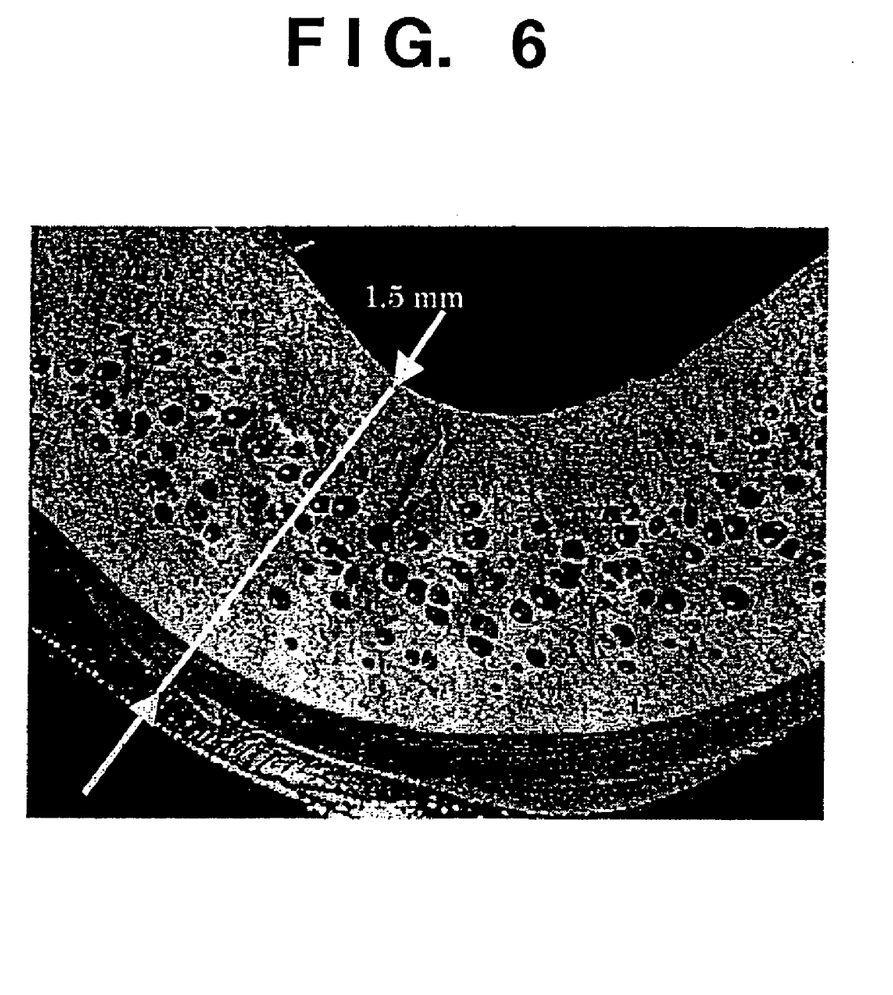
FIG. 6 is a view showing the foamed state of the section of a foamed product obtained by injection foaming after being left to stand for 1 hr without using the present invention.

FIG. 6 shows the foamed state of the section of a foamed product obtained by injection foaming after being left to stand for 1 hr without using the present invention. It is readily understood from comparison of FIGS. 5 and 6 that the control method of this example is very effective in maintaining the foamed state.

Figure 8:
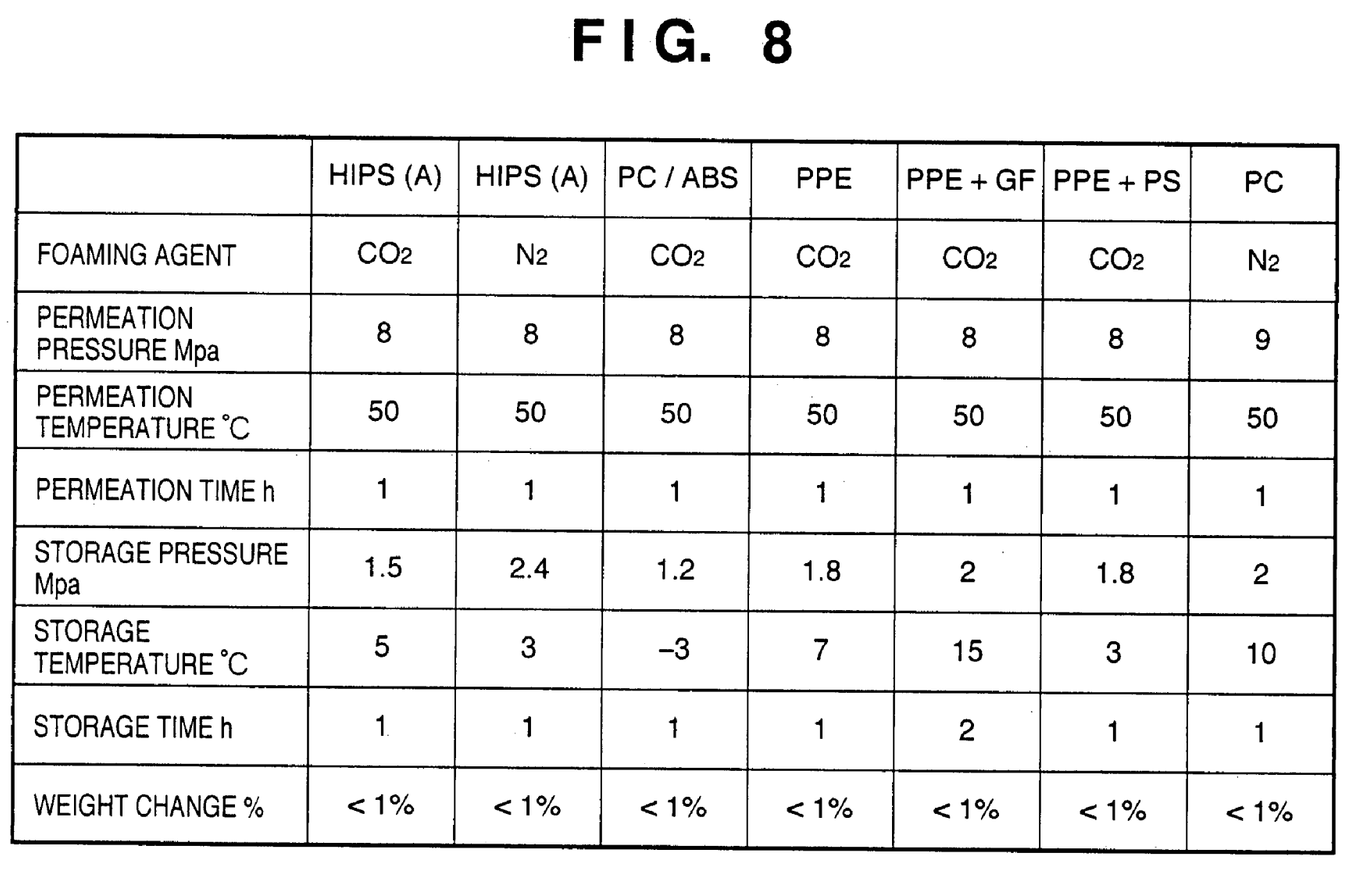
FIG. 8 is a view showing the second example of the embodiment.

FIG. 8 is a view showing the second example according to the embodiment.

The second example will be explained with reference to FIG. 8.

There were six types of resin materials, i.e., high-impact polystyrene (HIPS), an alloy material (PC/ABS) of polycarbonate and acrylonitrile_butadiene-styrene, polyphenylene ether (PPE), a resin (PPE+GF) formed by filling polyphenylene ether with a glass filler, a resin (PPE+PS) formed by mixing a glass filler in an alloy of polyphenylene ether and polystyrene, and polycarbonate (PC). Carbon dioxide was used as an inert gas and a foaming gas. FIG. 8 shows the saturation pressure, saturation temperature, and saturation time by which the carbon dioxide was allowed to saturate into the resin material, and also shows the storage pressure and storage temperature of this example.

The storage time and weight change shown in FIG. 8 reveal that when the storage pressure and storage temperature were adjusted within the range of this example by the resin material and saturation time, a change in the amount of the gas which saturated into the resin material decreased to 1% or less even when the storage time elapsed.

Figure 3:
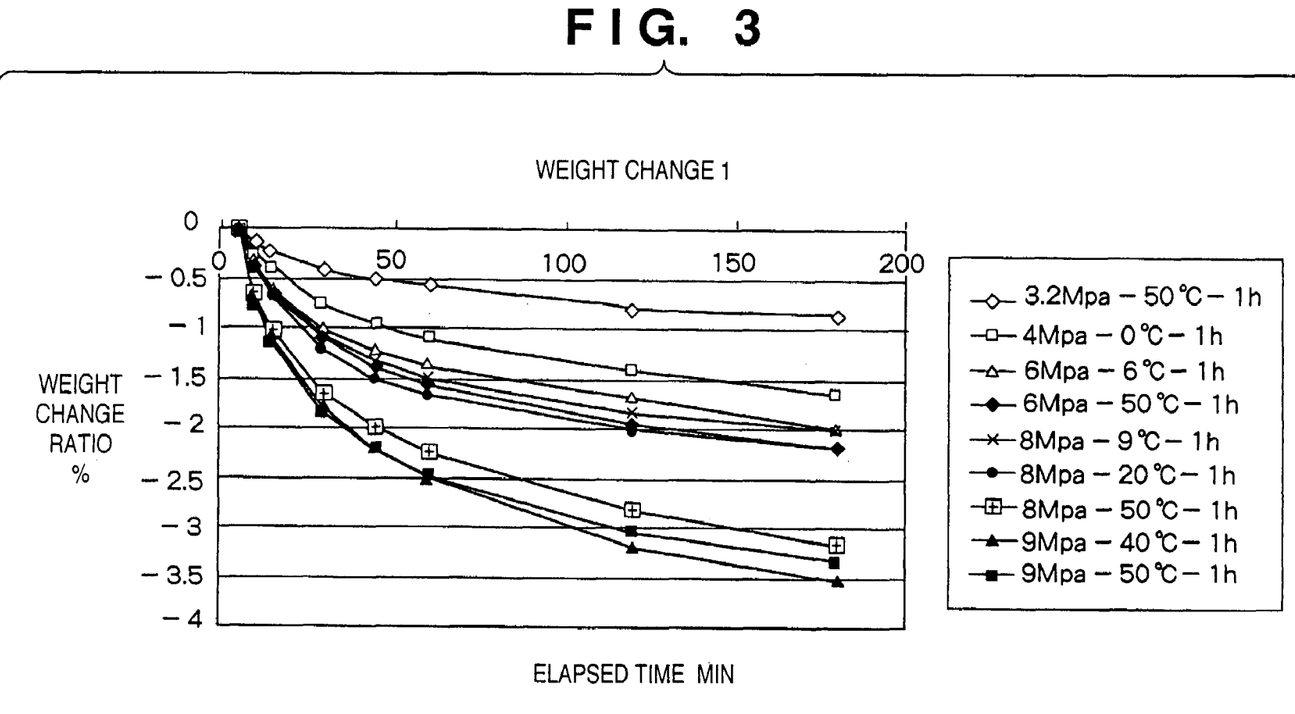
FIG. 3 is a graph showing changes in weights of HIPS materials at atmospheric pressure and room temperature after an inert gas is allowed to saturate into the materials by the conventional method.

FIG. 3 shows changes in weights of HIPS materials at atmospheric pressure and room temperature after an inert gas was allowed to saturate into the materials by the conventional method. For a more convenient measurement, a point five minutes after gas saturation is set to 0. As shown in FIG. 3, at any saturation pressure and any temperature, the gas escaped from the material with time.

Figure 4:
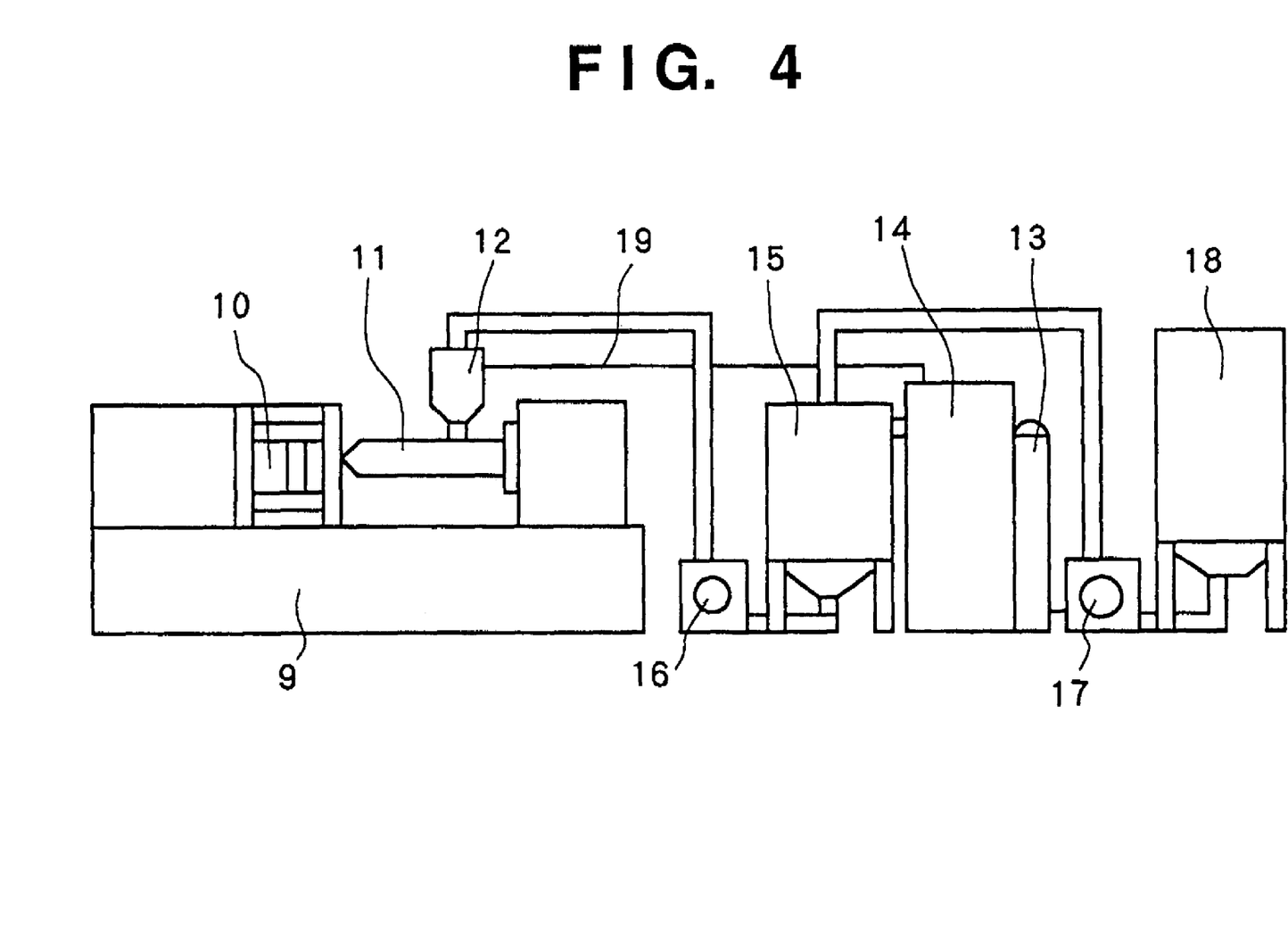
FIG. 4 is a view showing an example in which the apparatus of this embodiment is used as a hopper of an injection foaming machine.

FIG. 4 shows an example in which the apparatus of this embodiment is used as a hopper of an injection foaming machine.

In FIG. 4, reference numeral 9 denotes an injection foaming machine; 10, a metal mold; 11, a plasticator; 12, a hopper of this embodiment; 13, a gas cylinder; 14, a gas pressurizing apparatus; 15, a gas saturation vessel; 16 and 17, pumps; 18, a material silo; and 19, a pipe. The hopper 12 has the structures shown in FIGS. 1 and 2.

The foaming process will be described with reference to FIG. 4.

A pelletized resin material is stored in the material silo 18. When foaming is to be performed, a necessary amount of the resin material is supplied to the gas saturation vessel 15 by the pump 17. A gas as a foaming material is supplied from the gas cylinder 13 to the gas saturation vessel 15 after pressurized by the gas pressurizing apparatus 14. The gas saturates into the resin material in the gas saturation vessel 15. This resin material into which the gas saturates is supplied to the hopper 12 by the pump 16. In the hopper 12, the resin material into which the gas saturates is stored at the pressure and temperature of this embodiment. In addition, the resin material is supplied to a material feeder of the plasticator 11, plasticized and kneaded, and charged into a cavity having a desired shape in the metal mold 10. The resin into which the gas as a foaming material saturates starts foaming at the same time the resin is charged into the mold. After cooling, the foam is opened to extract the mold product.

As described above, an inert gas such as carbon dioxide or nitrogen was allowed to saturate into a solid polymer material, and the material was stored at the pressure and temperature of this embodiment. This made it possible to always maintain a predetermined gas saturated state. Accordingly, when this embodiment was used as a hopper of an injection foaming machine or extruder, it was possible to always supply a material having a stable gas saturation amount. Resin foaming and foamed products using this embodiment are harmless to the environment and superior in dimensional stability and productivity.

In the above embodiment, foam forming of resin materials is explained. However, the present invention is, of course, applicable not only to resin materials, but is also applicable to rubber materials and so-called polymer materials.

In the examples shown in FIGS. 7 and 8, the storage pressure was set at 1 to 2.5 MPa. In practice, however, the effect of the present invention can be obtained when the storage pressure is set at 0.5 to 4 MPa.

Also, the storage temperature was set at −3° C. to 15° C. in the examples shown in FIGS. 7 and 8. In practice, however, the effect of the present invention can be obtained when the storage temperature is set at −5° C. to 20° C.

As has been explained above, high-accuracy foamed products can be obtained with high productivity by the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A method of storing a material into which a gas saturates, wherein a gas is allowed to saturate into a resin material at a saturation pressure P (MPa) of not less than 4 (MPa) and a temperature T (° C.), and, letting m (−0.05<m<0.2) be a coefficient determined by a material type and a gas saturation time, the material is stored in an ambient defined by a pressure p (MPa) represented by:

$$p=P(0.02P+m),$$

and a temperature t represented by $$0.1875T-10<t<0.5T-10,$$

where 20° C. $\leq$ T $\leq$ 60° C.,
and represented by:

$$0.1875T-10<t\leq 20° C.,$$

where T>60° C.

2. The method according to claim 1, wherein the material is a resin material.

3. The method according to claim 1, wherein the material is a rubber material.

4. A method of storing a material into which a gas saturates, wherein 0.1 to 1.5 wt % of supercritical carbon dioxide are allowed to saturate into a pelletized solid resin material, and the solid resin material is stored at a temperature lower than a gas temperature when the carbon dioxide saturates, and at a high gas density.

5. A method of storing a material into which a gas saturates, wherein 0.1 to 1.5 wt % of supercritical carbon dioxide at a gas density of 0.08 to 0.2 g/cm³ is allowed to saturate into a pelletized solid resin material, and the solid resin material is stored at a gas density of 0.7 to 1.0 g/cm³.

* * * * *

UNITED STATES PATENT AND TRADEMARK OFFICE
CERTIFICATE OF CORRECTION

| | |
|---|---|
| PATENT NO. | : 7,182,897 B2 |
| APPLICATION NO. | : 10/634860 |
| DATED | : February 27, 2007 |
| INVENTOR(S) | : Takashi Arai |

It is certified that error appears in the above-identified patent and that said Letters Patent is hereby corrected as shown below:

<u>COLUMN 1</u>

Line 21, "was" should read --were--.

<u>COLUMN 2</u>

Line 59, "thereof" should read --thereof is--.

<u>COLUMN 3</u>

Line 13, "1-0," should read --10,--.

<u>COLUMN 6</u>

Line 40, "is" should read --being--; and
Line 57, "are" should read --is--.

Signed and Sealed this

Eighteenth Day of September, 2007

JON W. DUDAS
*Director of the United States Patent and Trademark Office*